US008612588B1

(12) United States Patent
Ehrlich et al.

(10) Patent No.: US 8,612,588 B1
(45) Date of Patent: Dec. 17, 2013

(54) POINT OF PRESENCE TO POINT OF PRESENCE WEB PAGE COMPRESSION

(75) Inventors: Ofir Ehrlich, Tel Aviv (IL); Dima Potekhin, Tel Aviv (IL); Tomer Altman, Tel Aviv (IL); Leonid Fainberg, Qiryat Gat (IL); Gil Shai, Givataim (IL); Ofer Gadish, Rishon Le'Tzion (IL); Amitay Dobo, Tel Aviv (IL)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 13/571,318

(22) Filed: Aug. 9, 2012

(51) Int. Cl.
*G06F 15/173* (2006.01)
*G06F 15/16* (2006.01)
*G06F 15/167* (2006.01)

(52) U.S. Cl.
USPC ............................ 709/224; 709/214; 709/217

(58) Field of Classification Search
None
See application file for complete search history.

(56) References Cited

U.S. PATENT DOCUMENTS

| 6,754,699 | B2 | 6/2004 | Swildens et al. | |
|---|---|---|---|---|
| 7,185,063 | B1 * | 2/2007 | Kasriel et al. | 709/216 |
| 7,293,093 | B2 | 11/2007 | Leighton | |
| 7,395,355 | B2 | 7/2008 | Afergan et al. | |
| 8,199,752 | B2 | 6/2012 | Swanson et al. | |

| 2004/0205208 | A1 * | 10/2004 | Koponen et al. | 709/230 |
|---|---|---|---|---|
| 2009/0254661 | A1 | 10/2009 | Fullagar et al. | |
| 2012/0041970 | A1 | 2/2012 | Ghosh et al. | |
| 2012/0198069 | A1 | 8/2012 | Black et al. | |
| 2012/0254343 | A1 * | 10/2012 | Harvell et al. | 709/214 |
| 2013/0185387 | A1 * | 7/2013 | Gero | 709/217 |

FOREIGN PATENT DOCUMENTS

| KR | 20030029244 A | 4/2003 |
|---|---|---|
| WO | 2011041709 A1 | 4/2011 |

OTHER PUBLICATIONS

AAPT & EdgeCast, "Content Delivery Network", Retrieved on Sep. 5, 2012 from http://www.aapt.com.au/sites/default/files/pdf/CDN_Brochure_15-05-2012.pdf, 2012, p. 1-4.
George Pallis, et al., "Insight and Perspectives for Content Delivery Network", Retrieved on Sep. 5, 2012 from http://gridsec.usc.edu/files/EE657/P2P-CDNetworks-Survey-2006.pdf, Jan. 2006, vol. 49, p. 1-6.

* cited by examiner

*Primary Examiner* — Wen-Tai Lin
(74) *Attorney, Agent, or Firm* — Kilpatrick Townsend & Stockton LLP

(57) ABSTRACT

A system and method for accelerating web page delivery is disclosed in one embodiment. Web requests are made to an edge server of a first point of presence (POP) of a content delivery network (CDN). The web content can be cached at the edge server in the first POP. Where the cache is missing the web content, it is queried from a second POP determined to be closer to the origin server for the web content. The second POP can have its own cache or request the web content from the origin server. Only missing components from the web content are passed to the first POP. Additionally, the missing components can be compressed.

19 Claims, 8 Drawing Sheets

POINT OF PRESENCE TO POINT OF PRESENCE WEB PAGE COMPRESSION

BACKGROUND

This disclosure relates in general to content delivery networks and, but not by way of limitation, to accelerating web page delivery.

The speed users expect from web browsing is increasing. After requesting a web page, only a fraction of second can pass before a user presumes a web page is inoperative or lacking sufficient quality of service (QoS). Caching is used to speed delivery of certain web content, but that caching is largely ineffective for dynamic content that is changing frequently or has components that change. The best web sites are the most responsive from the end user's perspective.

Content delivery networks (CDNs) have a geographically distributed network of points of presence (POPs) such that one is likely to be close to the end user. A request for content is matched to a nearby POP using routing, domain name service (DNS) diversion, redirection, Anycast and/or other techniques. An edge server in the POP will serve up the content from its cache, a host within the CDN or an origin server depending on where the content is located. For content that is missing from the CDN, the request to the origin server can be costly in terms of QoS.

SUMMARY

In one embodiment, the present disclosure provides a system and method for accelerating web page delivery. Web requests are made to an edge server of a first point of presence (POP) of a content delivery network (CDN). The web content can be cached at the edge server in the first POP. Where the cache is missing the web content, it is queried from a second POP determined to be closer to the origin server for the web content. The second POP can have its own cache or request the web content from the origin server. Only missing components from the web content are passed to the first POP. Additionally, the missing components can be compressed.

In another embodiment, a method for accelerating content delivery using a CDN comprised of a plurality of POPs is disclosed. A content request for content is received at a first POP of the plurality of POPs. The content request includes a universal resource indicator (URI). It is determined if the content is cached in the first POP. Based upon an outcome of the determination: determining a second POP is closer to an origin of the content than the first POP and requesting the content from the second POP. It is determined if the content is stored in the second POP. Performing differential coding of the content to produce abbreviated content based upon similar content stored at the first POP. The abbreviated content is passed from the second POP to the first POP. The content is reconstituted at the first POP using the abbreviated content and the similar content. The content is returned according to the content request.

In yet another embodiment, a CDN for accelerating content movement internally within the CDN is disclosed. The CDN includes one or more processors, and one or memories coupled with the one or more processors. The one or more processors and one or more memories are configured to: receive a content request for content at a first point of presence (POPs), which is part of a plurality of POPs, wherein the content request includes a universal resource indicator (URI); determine if the content is cached in the first POP; based upon the outcome of the preceding determining limitation: determine a second POP, which is part of the plurality of POPs, is closer to an origin of the content than the first POP, and request the content from the second POP; determine if the content is stored in the second POP; differential code the content to produce abbreviated content based upon similar content stored at the first POP; pass the abbreviated content from the second POP to the first POP; and reconstitute the content at the first POP using the abbreviated content and the similar content; and return the content according to the content request.

In still another embodiment, a CDN for accelerating content movement internally within the CDN, which is comprised of a plurality of POPs. The CDN includes a first, second, and third POPs. The third POP is in a third geographic location, wherein the third POP is part of the plurality of POPs. The first POP in a first geographic location, wherein the first POP is part of the plurality of POPs. The first POP receives a content request for content, which include a universal resource indicator (URI). A determination is made if the content is cached in the first POP. The second POP is located in a second geographic location, wherein the second POP is part of the plurality of POPs. The first, second and third geographic locations are all different. A determination is made to decide that the second POP is closer to an origin of the content than either the first or third POP. The content is requested by the first POP from the second POP. It is determined if the content is stored in the second POP. Differential coding is performed the content to produce abbreviated content based upon similar content stored at the first POP. The abbreviated content is passed from the second POP to the first POP. The content is reconstituted at the first POP using the abbreviated content and the similar content. The content is returned by the first POP according to the content request.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
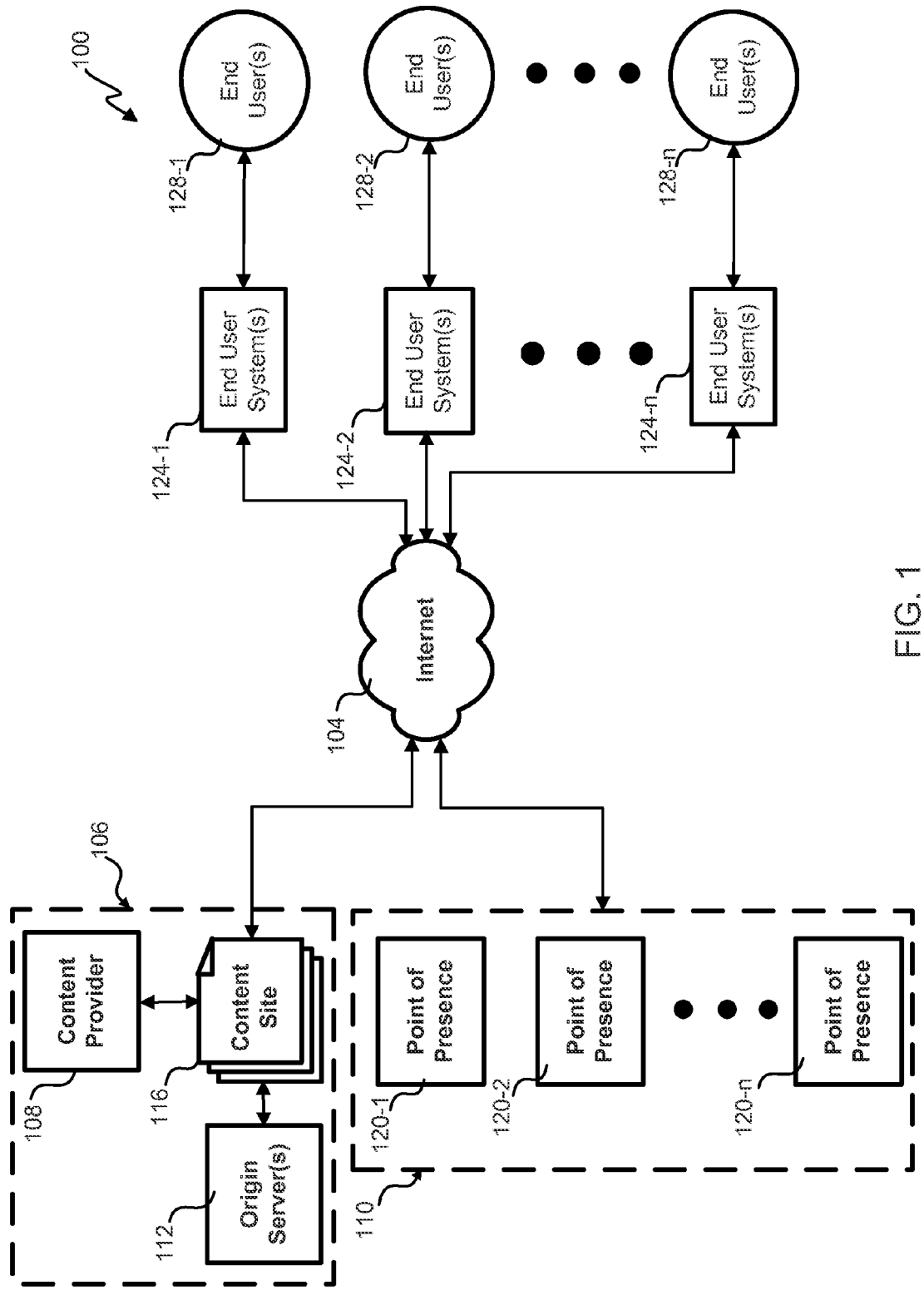
FIG. 1 depicts a block diagram of an embodiment of a content distribution system.

Referring first to FIG. 1, a block diagram of an embodiment of a content distribution system 100 is shown where a content originator 106 offloads delivery of the content objects to a content delivery network (CDN) 110. In this embodiment, the content distribution system 100 can dynamically and efficiently serve content objects (e.g., Javascript applets, images, Hypertext Markup Language (HTML), videos, Flash animations, etc.) over the Internet 104 to end user systems 102 by an efficient use of caches and acceleration within the CDN 110. For example, content objects used frequently on a webpage may be provided to user quickly even if the content object is dynamic. Caching by domain, sub-domain, origin server, IP address at a point of presence (POP) 120 near the content originator allows accumulation of different variations of dynamic content is a way that caching at an edge server is unlikely to achieve.

An end user 128 may request a set of content object, e.g., by requesting a webpage associated with one or more of content objects. For example, a user may request a file, such as a HTML file. The HTML file may include dynamic content that is customized for some or groups of end users 128. A source of each of the content objects and/or the file may be on an edge server, a host server within the CDN, the origin server 112, the content site 116, or on a cache in another POP 120. Where a cache or host outside the POP 120 receiving the request has the content object, differential ("diff") coding, delta coding and/or compression can be used to reduce the transportation cost and delay associated with transferring the content object or portion of a content object missing from the POP 120.

A content originator 106 produces and/or distributes content objects as the originator of content in a digital form for distribution with the Internet 104. Included in the content originator 106 are a content provider 108, a content site 116 and an origin server 112. The figure shows a single origin server 112, but it is to be understood embodiments could have multiple origin servers 112 that each can serve streams of the content object redundantly. For example, the content originator 106 could have multiple origin servers 112 and assign any number of them to serve the content object. The origin servers 112 for a given content site 116 could be widely distributed with some even being hosted by the CDN 110.

Although this figure only shows a single content originator 106 and a single CDN 110, there may be many of each in other embodiments. The content object is any content file or content stream and could include, for example, video, pictures, advertisements, applet, data, audio, software, HTTP content, and/or text. The content object could be live, delayed or stored. Throughout the specification, references may be made to a content object, content, and/or content file, but it is to be understood that those terms could be generally used interchangeably wherever they may appear. Some content is dynamic in that different end users 128 get different variations of the content, such that the dynamic content is not easily cached at the edge with the variations being pushed out of the cache before they might be requested again.

Many content providers 108 use the CDN 110 to deliver the content objects over the Internet 104 to end users 128. When a content object is requested by an end user 128, the CDN 110 may retrieve the content object from the content provider 108 for loading in a cache or hosting for a period of time. Alternatively, the content provider 108 may directly provide the content object to the CDN 110 for hosting, i.e., in advance of the first request or in servicing the first request. In this embodiment, the content objects are provided to the CDN 110 through caching and/or pre-population algorithms and stored in one or more servers such that requests may be served from the CDN 110. The origin server 112 holds a copy of each content object for the content originator 106. Periodically, the contents of the origin server 112 may be reconciled with the CDNs 110 through a cache and/or pre-population algorithm. Some embodiments could populate the CDN 110 with content objects without having an accessible origin server such that the CDN serves as the origin server, a host or a mirror. The CDN 110 can store entire content objects or portions of content objects.

The CDN 110 includes a number of points of presence (POPs) 120, which are geographically distributed through the content distribution system 100. Various embodiments may have any number of POPs 120 within the CDN 110 that are generally distributed in various locations around the Internet 104 to be proximate, in a network quality of service (QoS) sense, to end user systems 102. A wide area network (WAN), the Internet 104 and/or other backbone may couple the POPs 120 with each other and also couple the POPs 120 with other parts of the CDN 110. Other embodiments could couple POPs 120 together with the Internet 104 optionally using encrypted tunneling.

When an end user 128 requests a content link through its respective end user system 102, the request for the content is passed either directly or indirectly via the Internet 104 to the content originator 106. The request for content, for example, could be an HTTP Get command sent to an IP address of the content originator 106 after a look-up that finds the IP address. The content originator 106 is the source or re-distributor of content objects. The content site 116 is accessed through a content web site 116 in this embodiment by the end user system 102. In one embodiment, the content site 116 could be a web site where the content is viewable by a web browser. In other embodiments, the content site 116 could be accessible with application software other than a web browser. The content provider 108 can redirect content requests to any CDN 110 after they are made or can formulate the delivery path beforehand when the web page is formulated to point to the CDN 110. In any event, the request for content is handed over to the CDN 110 for fulfillment in this embodiment.

Once the request for content is passed to the CDN 110, the request is associated with a particular POP 120 within the CDN 110. A routing algorithm used to choose between different POPs 120 could be based upon efficiency, randomness, and/or proximity in Internet-terms, defined by the fabric of the Internet and/or some other mechanism. Other embodiments could find a POP 120 close to the end user system 124 using domain name service (DNS) diversion, redirection, Anycast and/or other techniques. The particular POP 120 then assigns or routes the request to an edge server. The particular POP 120 may retrieve the portion of the content object from the content provider 108. Alternatively, the content provider 108 may directly provide the content object to the CDN 110 and its associated POPs 120, i.e., in advance of the first request. In this embodiment, the content objects are provided to the CDN 110 and stored in one or more CDN servers such that the portion of the requested content may be served from the CDN 110. The origin server 112 holds one copy of each content object for the content originator 106. Periodically, the content of the origin server 112 may be reconciled with the CDN 110 through a cache, hosting and/or pre-population algorithm.

An edge server serving the request to the end user system 124 may access the requested content—either by locally retrieving part or all of the content or requesting it from another server. In some instances, the edge server determines a source for part or all of the requested content within the CDN 110 by querying other peer servers within or remote from the particular POP 120. This embodiment dynamically discovers peer servers, which have already cached or stored the requested content. The peer server that already holds the requested content could be an edge server or a server that doesn't service end user requests, for example, a relay server or ingest server. If part or all of the content cannot be found in the POP 120 originally receiving the request, neighboring POPs 120 could serve as the source in some cases, or the content could be sourced from the content originator 106.

Thus, a request from an end user system 102 for content may result in requests for content from one or more servers in the CDN 110. A CDN server (e.g., an edge server, peer servers, an origin server, etc.) may analyze requested content objects (e.g., requested HTML files), determined versions of the content objects that are cached locally, and transmit to other CDN servers a modified requested for content objects while signaling the versions of the content objects that are cached locally.

The end user system 102 processes the content for the end user 128 upon receipt of the content object. The end user system 102 could be a personal computer, media player, handheld computer Internet appliance, phone, IPTV set top, streaming radio or any other device that can receive and play content objects. In some embodiments, a number of end user systems 102 can be networked together sharing a single connection to the Internet 104. Changes could be made by the CDN 110 that does not affect the end user realization of the content except to speed delivery.

Figure 2A:
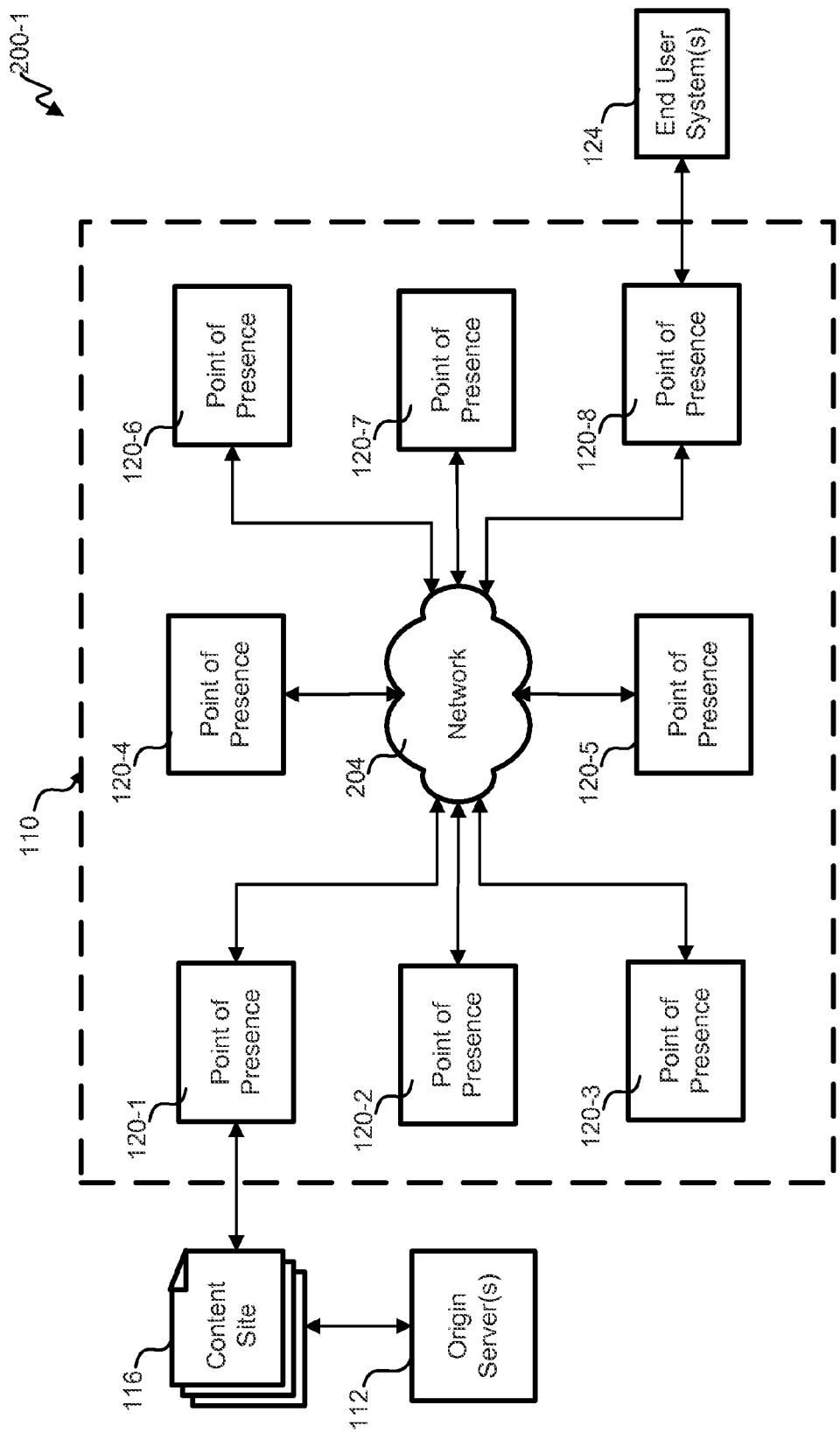
FIGS. 2A and 2B depict block diagrams of embodiments of web delivery system.

With reference to FIG. 2A, a block diagram of an embodiment of web delivery system 200-1 is shown. In this example, there are eight POPs 120 all interconnected by a network 204 that may include both private WAN or Internet 104 elements to allow communication between the POPs 120. This embodiment uses the CDN 110 to accelerate delivery of content objects by caching content sites and origin servers at a first POP 120-1 nearby for all the other POPs that might request content objects associated with the content site 116 and/or origin server.

In the depicted example, the end user system 124 requests a content object and has the request assigned to an eighth POP 120-8. The eighth POP 120-8 would determine a POP assigned to each domain, sub-domain, IP address, or other portion of the HTTP request to divide the requests between the various POPs 120. Other embodiments could use a variable or field in the HTTP request to assign HTTP requests to a particular POP 120 nearby the origin server 112 or content site 116. For example, the content site could be at a domain of ACME.gov that is assigned to the first POP 120-1. A server in the first POP 120 would provide the requested content from its cache and retrieve the content object from the content site 116 upon a cache miss.

It is to be appreciated that the first POP 120-1 will receive request from all POPs 120 in the CDN 110 for a given assigned domain. The cache in the first POP 120-1 will populate with the full spectrum of requests for the assigned domain. Compression algorithms, diff coding and/or delta coding is used between the frontend POP 120-8 and backend POP 120-1 to more efficiently use the network 204.

Figure 2B:
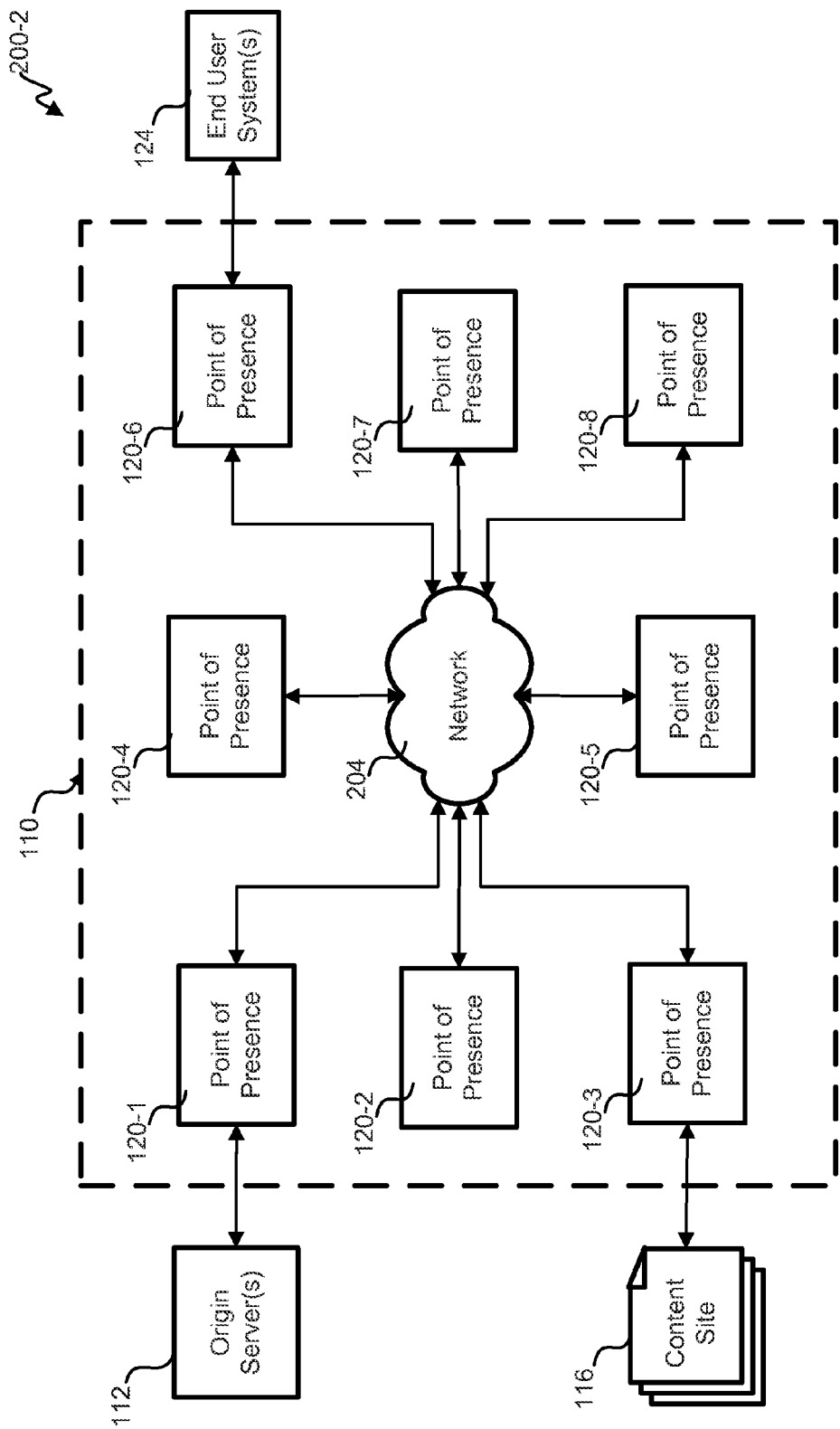

Referring next to FIG. 2B, a block diagram of an embodiment of web delivery system 200-2 is shown. In this embodiment, an end user system 124 is assigned to the sixth POP 120-6 of the CDN 110. A given HTTP request is for a content site 116 that is assigned a third POP 120-3 for fulfillment of those requests. Certain portions of the HTTP file may call for content objects stored on the origin server 112 that is assigned to a first POP 120-1. In this way, the fulfillment duties can be spread out among the POPs 120. This embodiment assigns origin servers 112 and content sites 116 according to an algorithm that chooses from among the POPs according to the one with the lowest latency, but other embodiments could make that choice based upon a function of latency, bandwidth, bandwidth cost, POP resources, POP loading, server resources, server loading, cache size, cache speed, and/or any other factor that affects quality of service (QoS).

Figure 3:
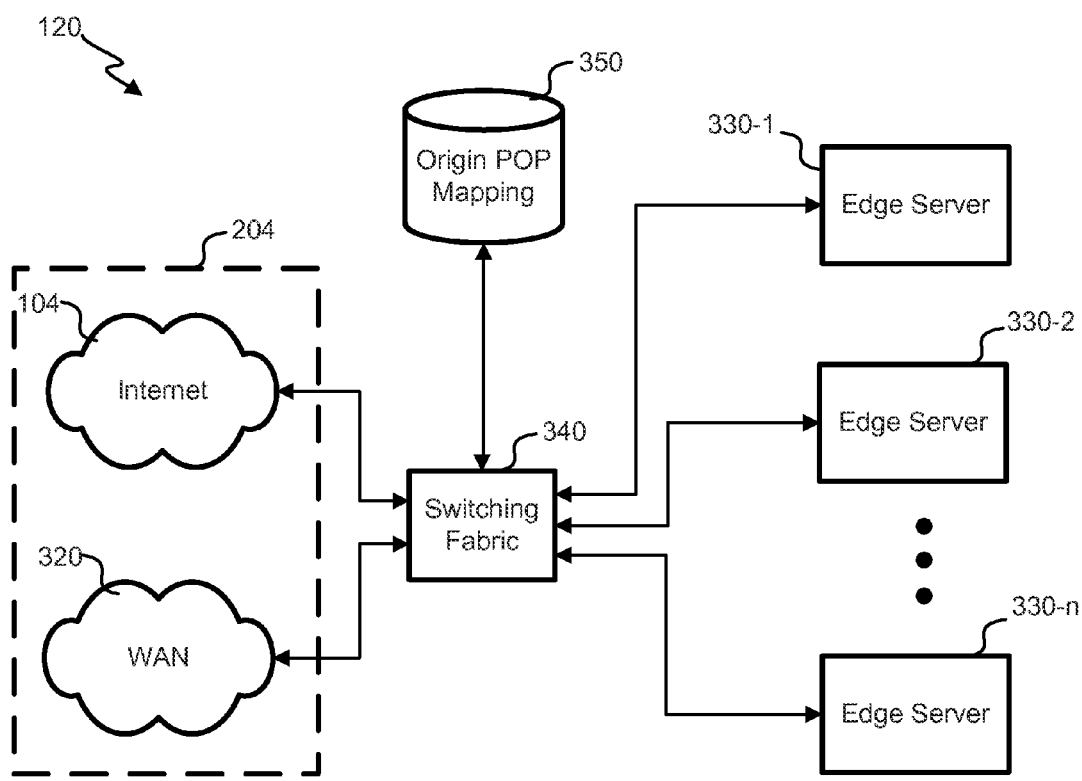
FIG. 3 depicts a block diagram of an embodiment of a point of presence (POP)

With reference to FIG. 3, a block diagram of an embodiment of a POP 120 is shown. A number of edge servers 330 are used to perform various functions in the POP 120. The edge servers 330 are hardware computers that can have one or more different functions instantiated for performing the various functions of the POP 120. The instantiations can be scaled up and down as different services are requested from the POP 120. The services offered include content hosting, content caching, web acceleration, compression, video and/or audio streaming, domain name service, cloud computing, gaming hosting, flash engines, encoding, etc. A particular edge server 330 can have several instantiations of the same or different services running simultaneously.

The edge servers 330 support web acceleration between POPs 120. The edge server 330 rewrites the URLs or links in web pages to refer to another POP closer to the source of the content requested in the URL. When a HTTP request is received by an edge server 330, the origin POP mapping store 350 is queried to find the POP that will intermediate requesting the HTTP. Should the origin POP mapping store 350 not have an entry for the domain, the POPs 120 can probe for quick accessibility to the origin server for the domain. Alternatively, algorithms or databases could be used to estimate the location of the domain to select a nearby POP. In this way, one POP is near the end user 128 and the other is near the origin server or content site for the HTTP universal resource locator (URL).

The switching fabric 340 routes information within the POP 120. Additionally, assignment of requests is performed by the switching fabric 340 using load balancing, round robin, random or another scheme to divide the processing between the edge servers 330 configured to perform a particular task. Where a request is received and it is determined that the frontend POP is not close to the end user system 124, in networking terms, the switching fabric 340 can redirect or reroute the request to another POP. Alternatively, the assigned edge server 330 can rewrite the links in the web page to reference the POP closer to the end user system 124.

Referring to Table I, a sampling of the information in the origin POP mapping store 350 is shown. Mapping can be keyed off any portion for the URL to specify a backend POP 120. For example, IP address 104.18.640.1 is mapped to the POP 120 located in Tempe, the subdomain of Blue.Realure- .com is mapped to the Denver POP 120, the path of Limelight.net/Aus/ is mapped to the Austin POP 120.

TABLE I

| Origin POP Mapping | |
|---|---|
| Domain | POP |
| 104.18.640.1 | Tempe |
| Franklin.info | East Bay |
| Blue.Realure.com | Denver |
| Limelight.com | San Jose |
| Townsend.com | Atlanta |
| Limelight.net/Aus/ | Austin |
| Sidewalkpaint.com | San Diego |
| media.Samba.org | London |
| ... | ... |
| USPTO.gov | Alexandria |

Some URLs are not rewritable, such as those generated by Javascript™, that have unique variables or coding specific to an end user or that are required to be in a certain format for whatever reason. The edge server 330 can recognize those circumstances such that the edge server 330 would not rewrite the URL and would instead directly contact the content site or origin site without a hop through another POP. Additionally, the edge server 330 recognizes when the current POP is both the closest to the end user 128 and the source of the content. The edge server 330 could directly contact the content source or the edge server 330 in the same POP that handles web caching for that domain. It could be the same edge server 330.

Figure 4:
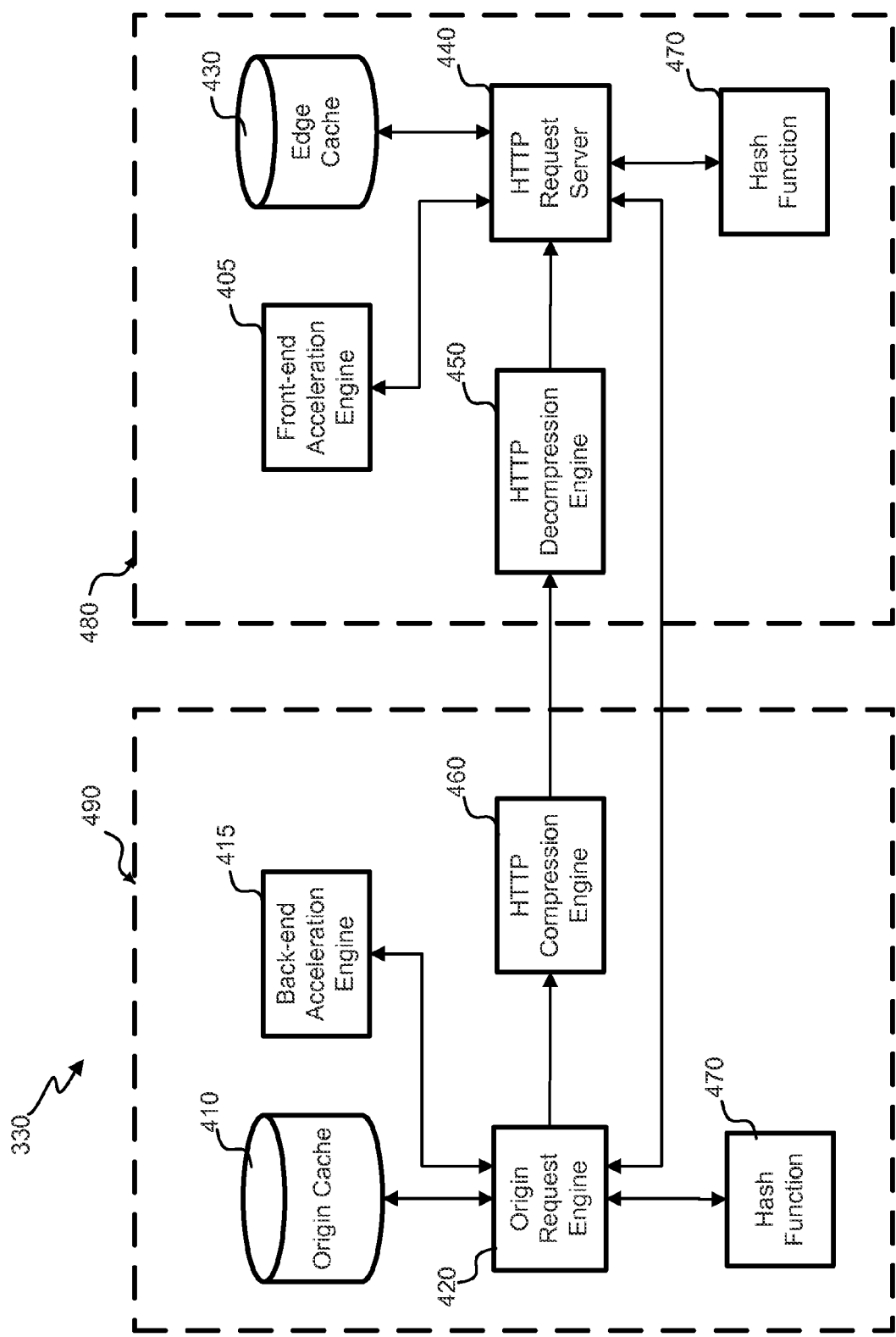
FIG. 4 depicts a block diagram of an embodiment of an edge server.

Referring next to FIG. 4, a block diagram of an embodiment of an edge server 330 running both ends of the interPOP acceleration in a split architecture is shown. It is to be understood that the functions of the frontend edge server 330 and the backend edge server 330 could be instantiated on the same or different physical hardware servers. For explaining the figure, a requesting function 480 is performed in a frontend POP 120 and a fulfillment function 490 is performed in a backend POP 120. The requesting function 480 includes an HTTP decompression engine 450, an HTTP edge cache 430, a HTTP request server 440, frontend acceleration engine 405, and a hash function 470. The fulfillment function 490 includes a HTTP compression engine 460, an origin request engine 420, a back-end acceleration engine 415, and an origin cache 410.

The HTTP request server 440 receives the connection from the end user system 124. The content specified in the URL could be stored in the frontend edge server 330. The HTTP request server 440 analyzes the request to characterize the web page and embedded links for various conditions. Table II shows examples of the different conditions that are screened for. Once a condition is recognized, split processing is specified. For example, if the HTTP request server finds that the HTML being requested is dynamic and possibly unique to the end user 128, the split processing condition specified by the HTTP request server 440 is non-cacheable HTML.

TABLE II

| Web Page Processing | |
|---|---|
| Condition | Split Processing |
| Containerized Objects | Non-cacheable Resource |
| Dynamic HTML | Non-cacheable HTML |
| No Backend POP Assigned | Front-end Requested Resource |
| Static Web Page | Cachable HTML |
| ... | ... |
| Wrong Frontend POP | Assign Resources to Correct POP |

Table III shows what functions are involved with a given split processing condition. The split processing defines whether a backend POP 120 will be involved and where caching and acceleration is performed. Although not shown in the table, the HTTP request server 440 can also define if two-level caching is performed with frontend cache using backend caching as a parent cache and whether compression is used between the frontend and backend POPs 120. In this manner, caching, acceleration and/or interPOP compression can be specified on an individual web page or link basis.

TABLE III

| | Split Processing | | | |
|---|---|---|---|---|
| | Frontend POP | | Backend POP | |
| Split Processing | Accelerate | Cache | Accelerate | Cache |
| Cachable HTML | Yes | Yes | Yes | No |
| Cachable Non-frontend-optimized Resource | No | Yes | No | Yes |
| Cachable Frontend Optimized Resource | Yes | Yes | Yes | No |
| Frontend Requested Resource | Yes | Yes | No | No |
| Non-cacheable HTML | Yes | No | Yes | No |
| Non-cacheable Resource | Yes | No | Yes | No |
| Acceleration Engine Resource | Yes | No | No | No |

When specified, the edge cache 430 is queried for content corresponding to the URL or similar URLs. Content items in the edge cache 430 are indexed by a hash of the content item itself. The content cached can be HTTP, an entire file, a portion of a file, a function, a piece of run-time code, etc. A hash function 470 performs a hash of the content items stored in the edge cache 430 and the edge cache 430 is indexed by hash.

Acceleration techniques speed the user experience. Many acceleration techniques rewrite web sites on the fly, that is to say after their request. To achieve the acceleration, links can be rewritten, HTML can be abbreviated or rewritten to run more efficiently, scripts and HTML can be rewritten or reordered. The frontend POP can turn on or off acceleration in either the frontend and/or the backend POP 120. In some embodiments, individual acceleration techniques can be selectively turned on and off for each web page request or link.

For content not found in the edge cache 430, the URL is optionally passed to the fulfillment function 490 in the backend POP determined by reference to the origin POP mapping store 350. Hashes for the content items found in the edge cache 430 are added to the URL so that the origin request engine 420 knows what content items are stored in the edge cache 430. The origin request engine 420 checks the origin cache to see if the content item is stored in the POP 120. Where the content item is not found locally, the origin server 112 or content site 116 can be queried for the content item.

Once the content item is found or retrieved, it can be delivered to the requesting function 480. Since the origin request engine 420 knows the content items stored at the edge cache 430 and knows what is in the content items from a prior request from the requesting function 480, the origin request engine 420 can do a diff or delta function to determine only the unique components using the HTTP compression engine 460. The compressed item is passed to the HTTP decompression engine 450 with information on how to reconstitute the content item. Optionally, the changed information found through diff or delta coding can be further compressed using algorithms that find patterns and redundancies to further reduce the size. Although not shown, link layer and/or persistent compression at higher layers can be performed on all content passing interPOP.

The HTTP request server 440 stores the reconstituted content item after using the hash function to find a hash used to create an index for the edge cache. The reconstituted content item is passed to the end user system 124 that made the initial request. In this way, two-level caching is used to accelerate content delivery in one embodiment. The connection between the frontend POP 120 and the backend POP 120 could be over the Internet 104, a private or leased-line WAN 320 or an encrypted tunnel over the Internet 104 in various embodiments.

Both the frontend and backend POPs can perform web page acceleration. This acceleration is an accumulation of processing techniques to optimize the end user experience when viewing web pages. Generally, the most interesting content in the web page is sped up using a number of techniques. These techniques can optimize different portions of the delivery chain, for example, the back-end acceleration engine 415 can optimize gathering information from the origin server along with accelerating how that information is provided to the frontend POP 120. The frontend acceleration engine 405 can optimize gathering content from the backend POP 120 or the origin server. The frontend and backend acceleration engines 405 optional have additional caching functionality separately indexed as part of their various optimization's.

The HTTP request server specifies various processing by adding information and rearranging links. For example, the backend POP 120 could be specified as a subdomain in the URI and whether caching is performed specified in a variable in the rewritten link. Links are passed between functions in a given POP 120 or between POPs 120. Other embodiments could use a signaling channel separate from the link to specify the processing. Some embodiments could specify specific caching parameters, acceleration techniques and compression parameters in the rewritten links.

Figure 5:
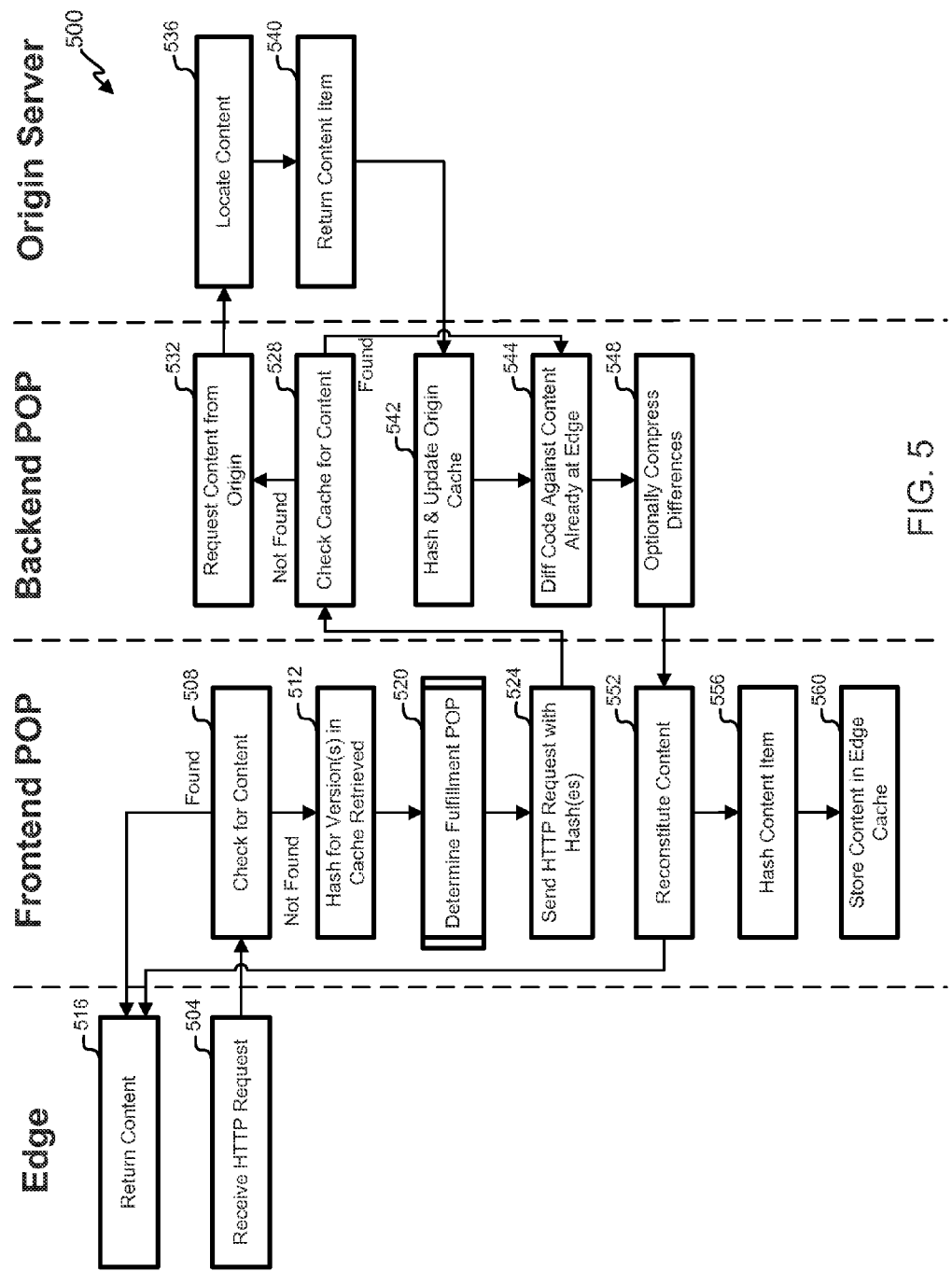
FIG. 5 illustrates a swim diagram of an embodiment of a process for accelerated delivery of web content.

With reference to FIG. 5, a swim diagram of an embodiment of a process 500 for accelerated delivery of web content is shown. The depicted portion of the process begins in block 504 where the requesting function 480 in a frontend POP 120 receives a HTTP request in the form of a URL or link. To use the CDN 110, the URL has been rewritten to point to a domain of the CDN 110. Through any of a number of techniques, the frontend POP 120 is chosen because it is nearby, in an Internet sense, to the end user system 124. In block 508, the HTTP request server 440 checks for the content item in the edge cache 430. Where the content item is found, it is returned to the end user system 124 in block 516.

In the event that the content item is not found, the hashes for the similar content items are retrieved from the cache are retrieved from the edge cache in block 512. The backend POP 120 is determined in block 520. The HTTP request is sent with embedded hashes in block 524. The fulfillment function 490 receives the HTTP request and checks the origin cache 410 for the content item in block 528. Where the content item is found, processing continues to block 544 where diff or delta coding is used to only return the unique portions of the content item. Optional compression of those differences is performed in block 548.

The processed content item is passed to HTTP request server 440 for reconstitution in block 552. In block 556, the content item is hashed with the hash function 470. The content item is stored in the edge cache 430 in block 560. In block 516, the content item is returned to the end user system. Blocks 556 and 560 can be performed after returning the content item in block 516.

Returning to block 528 under the scenario that the origin cache 410 does not have a copy of the content item, processing continues to block 532 where the content is requested from the origin server 112 or content site 116. In block 536, the content is located and returned to the backend POP 120 in block 540. Next, the fulfillment function 490 hashes the content item and updates the origin cache 410 in block 542. Diff or delta coding is performed in block 544 and processing continues as outlined above to update the edge cache 430 and deliver the content item to the end user system.

Figure 6:
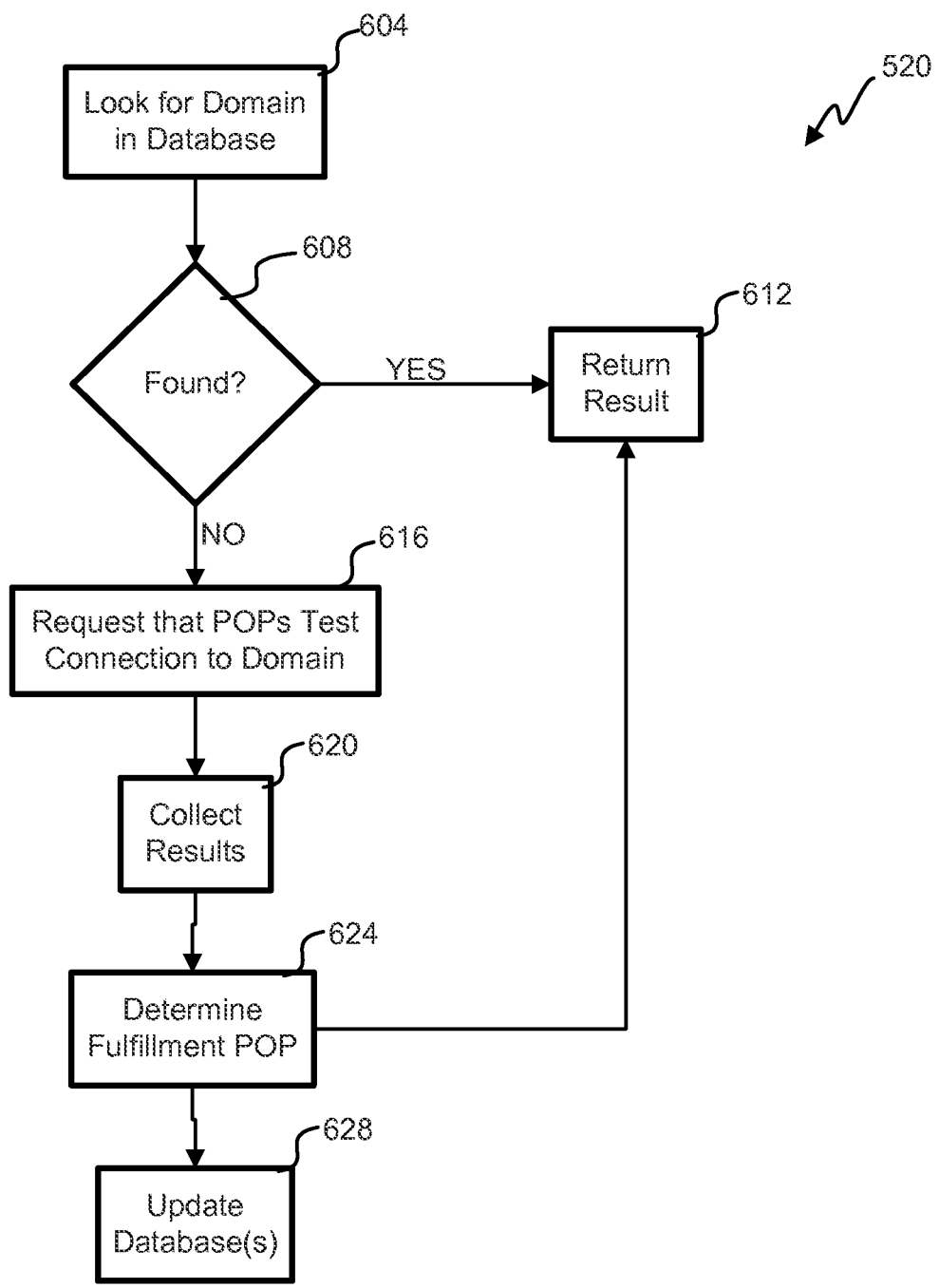
FIG. 6 illustrates a flowchart of an embodiment of a process for updating the mapping of origin server domains to POPs of the content delivery network (CDN)

Referring next to FIG. 6, a flowchart of an embodiment of a sub-process 520 for updating the mapping of origin server domains to POPs of the CDN 110 is shown. In block 604, the domain or other source indicator is searched for in the origin POP mapping store 350. If found in block 608, the resulting POP is returned in block 612. Where there is no backend POP 120 in the origin POP mapping store 350, processing goes from block 608 to block 616 to cause all the POPs to test their connection to the domain. The results are collected in block 620 to determine the backend POP in block 624. The result is returned to the HTTP request server 440 in block 612. The origin POP mapping store 350 is updated in block 628. Other embodiments could find the backend POP without testing each connection by looking up the estimated location for the domain and choosing a nearby POP 120.

A number of variations and modifications of the disclosed embodiments can also be used. For example, although above embodiments discuss interPOP compression of HTTP content, other embodiments could compress any type of content object between POPs. Signaling of what is found in the frontend POP could use mechanisms other than embedding a code or hash in the URL, for example using an API or signaling channel.

Figure 7:
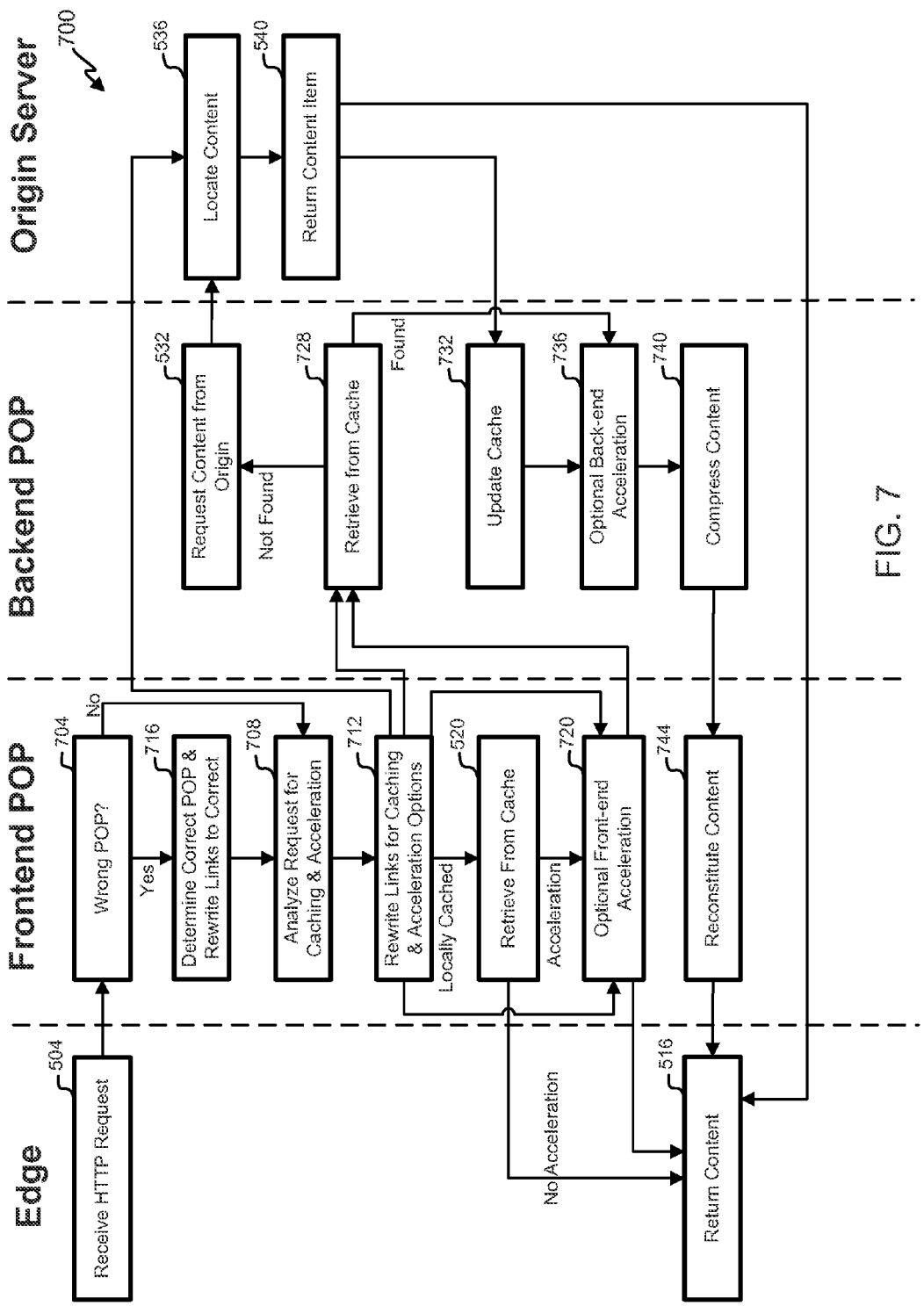
FIG. 7 illustrates a swim diagram of another embodiment of a process for delivery of web content with optional caching and acceleration.

With reference to FIG. 7, a swim diagram of another embodiment of a process 700 for delivery of web content with optional caching and acceleration is shown. This embodiment details the different types of caching and acceleration that can be specified for a web page or link. The depicted portion of the process 700 begins in block 504 where a frontend POP 120 receives a HTTP request. The location of the DNS or DNS cache used by the end user system 124 often defines which frontend POP 120 will be initially chosen as an approximation of the location of the end user system 124, but that premise can often be wrong such that a POP 120 is used that is not close. The IP address of the end user system 124 can be used to determine if the wrong POP was initially chosen and where that is the case the request can be routed, redirected or just have the links rewritten to the correct POP 120 in block 716.

In block 708, conditions in the web page are analyzed to determine the split architecture processing. Several processing paths branch out from block 708. The link(s) are rewritten to specify the caching and acceleration to be performed in specified POPs. For example, a frontend POP 120 might be specified for caching the content without using acceleration after a determination that acceleration is unlikely to aid the end user experience. Where content is locally cached, processing continues to block 520 to retrieve the content and optionally acceleration in block 720 before returning the content in block 516.

Back to block 708, it could determined that a backend POP 120 should be used. Where the backend POP 120 is not used, the content can be directly gathered from the origin server in blocks 536 and 540 before it is returned in block 516. Where the frontend POP 120 decides to use a backend POP 120, processing can go to block 728 for retrieval of the content from the origin cache 410 and on a cache miss, requesting the content from the origin in blocks 532, 536, 540. The content found at the origin is updated into the cache in block 732. Optional acceleration is performed in block 736 before returning the content to the frontend POP 120.

A number of variations and modifications of the disclosed embodiments can also be used. For example, although above embodiments discuss interPOP compression of HTTP content, other embodiments could compress any type of content object between POPs. Signaling of what is found in the requesting POP could use mechanisms other than embedding a code or hash in the URL, for example using an API or signaling channel.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for accelerating content delivery using a content delivery network (CDN) comprised of a plurality of points of presence (POPs), comprising:
  receiving a first content request for a first content at a first POP of the plurality of POPs, wherein the first content request includes a first universal resource indicator (URI), wherein:
    the first URI is rewritten to refer to a second POP closer to an origin of the content than the first POP; and
    the first URI is rewritten to specify acceleration to be performed with the first POP;
  indexing content items stored at the first POP with hashes using a hash function;
  determining if the first content is cached in the first POP;
  based upon an outcome of preceding determining limitation:
    determining the second POP is closer to the origin of the first content than the first POP,
    adding a hash to the first URI indicating a first similar content stored at the first POP, and
    requesting the first content from the second POP using the first URI with the hash;
  determining if the first content is stored in the second POP;
  differential coding the first content to produce a first abbreviated content based upon the hash in the first URI;
  passing the first abbreviated content from the second POP to the first POP;
  reconstituting the first content at the first POP using the first abbreviated content and the first similar content;
  returning the first content according to the first content request;
  receiving a second content request for a second content at a third POP of the plurality of POPs, wherein the second content request includes a second URI;

determining if the second content is cached in the third POP;
based upon a determination that the second content is not cached in the third POP:
    determining the second POP is closer to an origin of the second content than the third POP, and
    requesting the second content from the second POP;
determining if the second content is stored in the second POP;
differential coding the second content to produce a second abbreviated content based upon a second similar content stored at the third POP;
passing the second abbreviated content from the second POP to the third POP;
reconstituting the second content at the third POP using the second abbreviated content and the second similar content; and
returning the second content according to the second content request.

2. The method for accelerating content delivery using the content delivery network comprised of the plurality of POPs as recited in claim 1, further comprising:
determining that the first URI should not be modified, and requesting the first content directly from an origin server.

3. The method for accelerating content delivery using the content delivery network comprised of the plurality of POPs as recited in claim 1, further comprising:
determining that the first content is not dynamic, and
caching the first content in the first POP based upon an outcome of the immediately preceding determining limitation.

4. The method for accelerating content delivery using the content delivery network comprised of the plurality of POPs as recited in claim 1, further comprising:
determining that the first content is dynamic; and
skipping the interaction with the second POP to directly request the first content from the origin of the first content from the first POP.

5. The method for accelerating content delivery using the content delivery network comprised of the plurality of POPs as recited in claim 1, further comprising:
compressing the first content before passing the first abbreviated content from the second POP to the first POP.

6. The method for accelerating content delivery using the content delivery network comprised of the plurality of POPs as recited in claim 1, wherein the differential coding of the first content and the second content uses a delta coding algorithm.

7. The method for accelerating content delivery using the content delivery network comprised of the plurality of POPs as recited in claim 1, further comprising:
requesting the first content from the origin of the first content from the second POP.

8. A computing system configured to perform the machine-implementable method for accelerating content delivery using the content delivery network comprised of the plurality of POPs as recited in claim 1.

9. One or more non-transitory machine-readable medium having machine-executable instructions configured to perform the machine-implementable method for accelerating content delivery using the content delivery network comprised of the plurality of POPs of claim 1.

10. A content delivery network (CDN) for accelerating content movement internally within the CDN, the CDN comprising:
one or more processors; and
one or memories coupled with the one or more processors, wherein the one or more processors and one or more memories are configured to:
    index content items stored at the first point of presence (POP) with hashes using a hash function;
    receive a first content request for first content at a first POP, which is part of a plurality of POPs, wherein:
        the first content request includes a first universal resource indicator (URI);
        the first URI is rewritten to refer to a second POP closer to an origin of the content than the first POP; and
        the first URI is rewritten to specify acceleration to be performed with the first POP;
    determine if the first content is cached in the first POP;
    based upon an outcome of preceding determining limitation:
        determine the second POP, which is part of the plurality of POPs, is closer to the origin of the first content than the first POP,
        add a hash to the first URI indicating a first similar content stored at the first POP, and
        request the first content from the second POP;
    determine if the first content is stored in the second POP;
    differential code the first content to produce a first abbreviated content based upon the hash in the first URI;
    pass the first abbreviated content from the second POP to the first POP; and
    reconstitute the first content at the first POP using the first abbreviated content and the first similar content; and
    return the first content according to the first content request;
    receive a second content request for second content at a third POP, which is part of the plurality of POPs, wherein the second content request includes a second URI;
    determine if the second content is cached in the third POP;
    based upon a determination that the second content is not cached in the third POP:
        determine the second POP is closer to an origin of the second content than the third POP, and
        request the second content from the second POP;
    determine if the second content is stored in the second POP;
    differential code the second content to produce a second abbreviated content based upon a second similar content stored at the third POP;
    pass the second abbreviated content from the second POP to the third POP; and
    reconstitute the second content at the third POP using the second abbreviated content and the second similar content; and
return the second content according to the second content request.

11. The CDN for accelerating content movement internally within the CDN as recited in claim 10, wherein the one or more processors and one or more memories are further configured to:
determine that the first URI should not be modified, and request the first content directly from an origin server.

12. The CDN for accelerating content movement internally within the CDN as recited in claim 10, wherein the one or more processors and one or more memories are further configured to:

determine that the first content is not dynamic, and
cache the first content in the first POP based upon an outcome of the immediately preceding determining limitation.

13. The CDN for accelerating content movement internally within the CDN as recited in claim 10, wherein the one or more processors and one or more memories are further configured to:
determine that the first content is dynamic; and
skip the interaction with the second POP to directly request the first content from the origin of the first content from the first POP.

14. The CDN for accelerating content movement internally within the CDN as recited in claim 10, wherein the one or more processors and one or more memories are further configured to:
compress the first content before passing the first abbreviated content from the second POP to the first POP.

15. A content delivery network (CDN) for accelerating content movement internally within the CDN, which is comprised of a plurality of points of presence (POPs), the CDN comprising:
a first POP in a first geographic location, wherein:
the first POP is part of the plurality of POPs,
the first POP receives a first content request for a first content,
content items stored in the first POP are indexed with hashes using a hash function,
the first content request includes a first universal resource indicator (URI),
the first URI is rewritten to refer to a second POP closer to an origin of the content than the first POP,
the first URI is rewritten to specify acceleration to be performed with the first POP,
a determination is made if the first content is cached in the first POP, and
a hash is added to the first URI indicating a first similar content stored at the first POP;
a third POP in a third geographic location, wherein:
the third POP is part of the plurality of POPs,
the third POP receives a second content request for a second content,
the second content request includes a second URI, and
a determination is made if the second content is cached in the third POP; and
a second POP in a second geographic location, wherein:
the second POP is part of the plurality of POPs,
the first, second, and third geographic locations are all different,
a determination is made to decide that the second POP is closer to an origin of the first content than either the first or third POP,
the first content is requested by the first POP from the second POP using the first URI with the hash added to the first URI,
it is determined if the first content is stored in the second POP,
differential coding is performed on the first content to produce a first abbreviated content based upon the hash added to the first URI,
the first abbreviated content is passed from the second POP to the first POP,
the first content is reconstituted at the first POP using the first abbreviated content and the first similar content,
the first content is returned by the first POP according to the first content request,
a determination is made to decide that the second POP is closer to an origin of the second content than either the first or third POP,
the second content is requested by the third POP from the second POP,
it is determined if the second content is stored in the second POP,
differential coding is performed on the second content to produce a second abbreviated content based upon a second similar content stored at the third POP,
the second abbreviated content is passed from the second POP to the third POP,
the second content is reconstituted at the third POP using the second abbreviated content and the second similar content, and
the second content is returned by the third POP according to the second content request.

16. The CDN for accelerating content movement internally within the CDN, which is comprised of a plurality of POPs as recited in claim 15, wherein:
it is determined that the first URI should not be modified, and
the first content is requested directly from an origin server.

17. The CDN for accelerating content movement internally within the CDN, which is comprised of a plurality of POPs as recited in claim 15, wherein:
it is determined that the first content is not dynamic, and
the first content is cached in the first POP based upon an outcome of the immediately preceding determining limitation.

18. The CDN for accelerating content movement internally within the CDN, which is comprised of a plurality of POPs as recited in claim 15, wherein:
it is determined that the first content is dynamic; and
interaction with the second POP is skipped to directly request the first content from the origin of the first content from the first POP when the first content is dynamic.

19. The CDN for accelerating content movement internally within the CDN, which is comprised of a plurality of POPs as recited in claim 15, wherein the first content is compressed before passing the first abbreviated content from the second POP to the first POP.

* * * * *